United States Patent
Toura (10) Patent No.: US 7,821,671 B2
(45) Date of Patent: Oct. 26, 2010

(54) IMAGE PROCESSING APPARATUS AND IMAGE PROCESSING METHOD

(75) Inventor: Kosuke Toura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 426 days.

(21) Appl. No.: 11/837,789

(22) Filed: Aug. 13, 2007

(65) Prior Publication Data

US 2008/0043300 A1    Feb. 21, 2008

(30) Foreign Application Priority Data

Aug. 18, 2006    (JP) .............................. 2006-223212

(51) Int. Cl.
    *G06F 15/00*    (2006.01)
(52) U.S. Cl. ......................... 358/1.9; 358/525; 358/518; 395/109
(58) Field of Classification Search ................. 358/525, 358/518, 1.9; 395/109
    See application file for complete search history.

(56) References Cited

U.S. PATENT DOCUMENTS 5,664,072 A * 9/1997 Ueda et al. .................... 358/1.9
7,068,859 B2 6/2006 Hiratsuka et al.

FOREIGN PATENT DOCUMENTS

| JP | 2002152534 | 5/2002 |
|----|------------|--------|
| JP | 2005-175917 A | 6/2005 |
| JP | 2006-033245 A | 2/2006 |

OTHER PUBLICATIONS

Office Action dated Jun. 1, 2010 in a corresponding Japanese patent application, and English-language translation, 6 pages.

\* cited by examiner

*Primary Examiner*—Twyler L Haskins
*Assistant Examiner*—Michael Burleson
(74) *Attorney, Agent, or Firm*—Buchanan Ingersoll & Rooney PC (57) ABSTRACT

Disclosed is an image processing apparatus for converting input image data based on n dimensional color space to output image data based on m dimensional color space, comprising: a storing section to store a color conversion value in the m dimensional color space determined for every lattice point obtained by dividing the n dimensional color space as lattice point data; and a color converting section to determine an interpolating operation point in the n dimensional color space based on the input image data, to perform an n dimensional Bi-cubic interpolating operation by using the lattice point data of a primary neighborhood lattice point and the lattice point data of a secondary neighborhood lattice point of the interpolating operation point out of the stored lattice point data, and to calculate a color conversion value of the interpolating operation point in the m dimensional color space.

6 Claims, 8 Drawing Sheets

IMAGE PROCESSING APPARATUS AND IMAGE PROCESSING METHOD

CROSS-REFERENCE TO RELATED APPLICATIONS

The present U.S. patent application claims a priority under the Paris Convention of Japanese patent application No. 2006-223212 filed on Aug. 18, 2006, which shall be a basis of correction of an incorrect translation.

BACKGROUND

1. Field of the Invention

The present invention relates to an image processing apparatus and an image processing method in which input image data based on n dimensional color space is converted to output image data based on m dimensional color space.

2. Description of Related Art

Generally, a color of input data from an input device is determined by a color space dependent on the input device, and a color converting process is performed in an output device such as a printer, etc. so that the input data corresponds to a color space of the output device. The color converting process is performed by using a converting table (LUT) in which an output data value after the color conversion is set at a lattice point. In the lattice, the color space of the input data is divided at even intervals. In between the lattice points, the output data values are determined by an interpolating operation (for example, see Japanese Patent Application Laid-Open Publication No. 2005-175917 and Japanese Patent Application Laid-Open Publication No. 2006-33245).

Some of the reasons why the interpolating operation is performed are for example, that when the output data values corresponding to all of the input data values are to be ensured, a memory having a very large capacity is required resulting in a costing problem, and that it is hardly practical due to the control issue. For example, in order to ensure all of the output data values of CMYK color space with 8 bits and 256 tones corresponding to input data values of RGB color space with 8 bits and 256 tones, it is required to ensure and manage data of $256^3$ (colors)×8 (bits)×4 (colors)=64 (megabytes).

Therefore, only the representative lattice points are arranged, and the values in between the lattice points are output by performing the interpolating operation. For example, when there are 33 lattice points arranged, the sufficient data capacity is $33^3$ (colors)×8 (bits)×4 (colors)≈0.14 (megabytes).

Conventionally, an interpolating operation method has been adopted in which the lattice points surrounding an interpolating operation point corresponding to the input data in the LUT are detected, and interpolating data which interpolates between the lattice points is calculated by using the output data values, i.e. lattice point data, which are determined for those lattice points.

Figure 8:
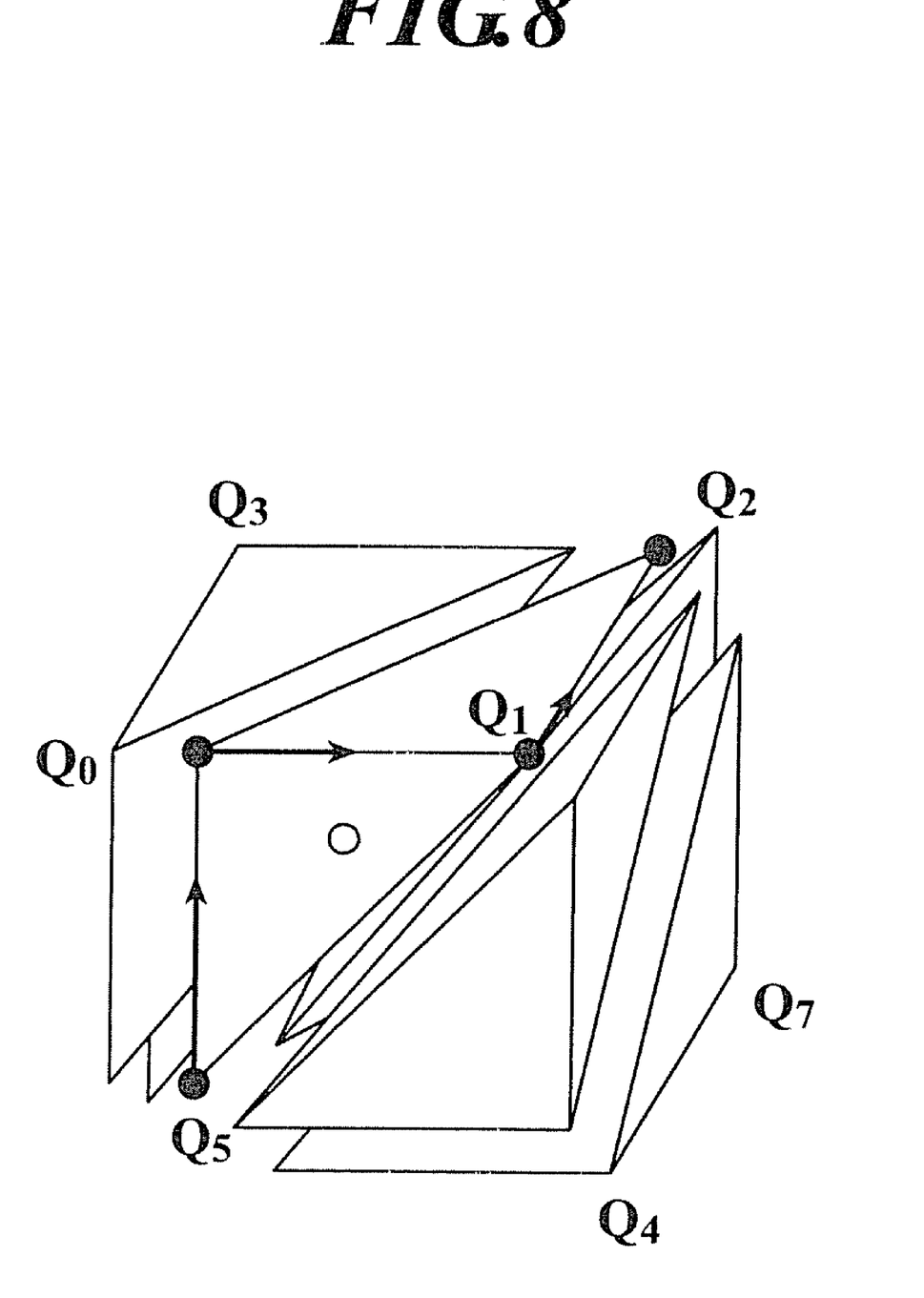
FIG. 8 is an explanatory diagram of a conventional interpolating operation method.

For example, as shown in FIG. 8, cubic space which is a minimum unit configured with lattice points (i.e. Q0 to Q7) is further divided into 4 tetrahedral spaces with an apex of Q2. Then, the tetrahedral space in which the interpolating operation point (as indicated in a white circle in FIG. 8) corresponding to the input data is included is obtained, and the lattice point data of the lattice point configuring the apex of the tetrahedral space is used for the interpolating operation. In addition to this, there is also a method of dividing the minimum unit into not tetrahedral space but cubic space. In this manner, in the conventional method, the accuracy of the interpolating operation is improved by making the space domain surrounded by the lattice points (hereinafter referred to as lattice space) as small as possible, and obtaining the lattice points close to the interpolating operation point.

However, lattice point data other than that of an apex which configures lattice space is not taken into account in any of the interpolating operation methods. Therefore, when the values vary precipitously in between the adjacent lattice points, the continuity of the output data values in the adjacent lattice spaces cannot be ensured.

In this respect, in the above mentioned Japanese Patent Application Laid-Open Publication No. 2005-175917 and Japanese Patent Application Laid-Open Publication No. 2006-33245, the continuity of the output data values is to be ensured by performing a smoothing processing to each of the lattice point data. However, in this method, the lattice point data which was initially obtained in a colorimetric and logical manner, is to be intentionally modified, and the accuracy of color conversion itself is degraded.

SUMMARY

It is one of objects of the present invention to perform color conversion with high accuracy, while ensuring the continuity of the output data values.

To achieve at least one of the above objects, an image processing apparatus reflecting one aspect of the present invention, for converting input image data based on n dimensional color space to output image data based on m dimensional color space, comprises:

a storing section to store a color conversion value in the m dimensional color space determined for every lattice point obtained by dividing the n dimensional color space as lattice point data; and a color converting section to determine an interpolating operation point in the n dimensional color space based on the input image data, to perform an n dimensional Bi-cubic interpolating operation by using the lattice point data of a primary neighborhood lattice point and the lattice point data of a secondary neighborhood lattice point of the interpolating operation point out of the stored lattice point data, and to calculate a color conversion value of the interpolating operation point in the m dimensional color space.

According to a second aspect of the present invention, an image processing apparatus for converting input image data based on n dimensional color space to output image data based on m dimensional color space, comprises:

a storing section to store a color conversion value in the m dimensional color space determined for every lattice point obtained by dividing the n dimensional color space as lattice point data; and a color converting section to resolve the n dimensional space into (n−1) dimensional color spaces in an n direction, to determine an interpolating operation point based on the input image data of each of the (n−1) dimensional color spaces, to calculate a color conversion value by performing an (n−1) dimensional Bi-cubic interpolating operation by using the lattice point data of a primary neighborhood lattice point and the lattice point data of a secondary neighborhood lattice point of the interpolating operation point out of the stored lattice point data, and to calculate a color conversion value of the interpolating operation point in the m dimensional color space based on the color conversion value calculated for each of the (n−1) dimensional color spaces.

According to a third aspect of the present invention, an image processing method for converting input image data based on n dimensional color space to output image data based on m dimensional color space by using a color conversion value in the m dimensional color space determined for every lattice point obtained by dividing the n dimensional color space as lattice point data, comprises:

determining an interpolating operation point in the n dimensional color space based on the input image data;

performing an n dimensional Bi-cubic interpolating operation by using the lattice point data of a primary neighborhood lattice point and the lattice point data of a secondary neighborhood lattice point of the interpolating operation point; and calculating a color conversion value of the interpolating operation point in the m dimensional color space.

According to a fourth aspect of the present invention, an image processing method for converting input image data based on n dimensional color space to output image data based on m dimensional color space by using a color conversion value in the m dimensional color space determined for every lattice point obtained from dividing the n dimensional color space as lattice point data, comprises:

resolving the n dimensional space into (n−1) dimensional color spaces in an n direction;

determining an interpolating operation point based on the input image data of each of the (n−1) dimensional color spaces;

calculating a color conversion value by performing an (n−1) dimensional Bi-cubic interpolating operation by using the lattice point data of a primary neighborhood lattice point and the lattice point data of a secondary neighborhood lattice point of the interpolating operation point; and calculating a color conversion value of the interpolating operation point in the m dimensional color space based on the color conversion value calculated for each of the (n−1) dimensional color spaces.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENTS

Hereinafter, an embodiment of the present invention concerning the image processing apparatus and the image processing method is described in detail with reference to the drawings.

In this embodiment, an example of color conversion in which input image data of 3 dimensional RGB color space is color-converted to output image data of 4 dimensional YMCK color space.

First, the configuration is described.

Figure 1:
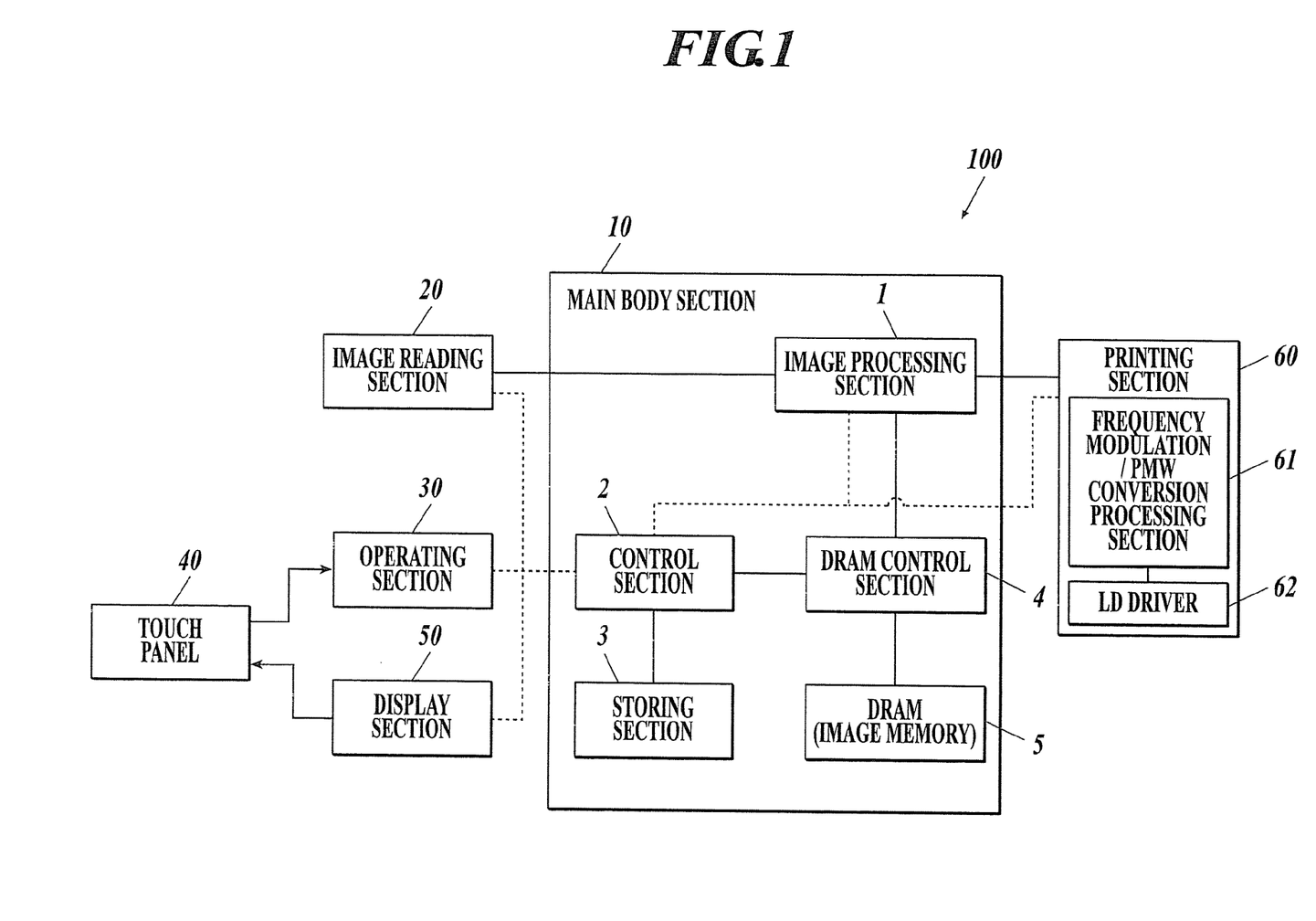
FIG. 1 is a diagram showing an MFP configuration to which an embodiment of the present invention is applied.

FIG. 1 shows the MFP (Multi Function Peripheral) 100 according to the embodiment of the present invention.

As shown in FIG. 1, MFP 100 comprises a main body section 10, an image reading section 20, an operating section 30, a touch panel 40, a display section 50, and a printing section 60, etc. The main body section 10 comprises an image processing section 1, a control section 2, a storing section 3, a DRAM (Dynamic Random Access Memory) control section 4, and DRAM 5.

The image reading section 20 comprises a light source, a CCD (Charge Coupled Device), an A/D converter, etc. During the image reading, an image is formed by using the reflected light of the light with which an original document is irradiated from the light source to scan the document, and the original document image is read by performing the photoelectric conversion of the reflected light by the CCD. As a result, an image signal (an analog signal) is generated. Then, the image signal is converted to digital image data by the A/D converter, and the digital image data is output to the image processing section 1 of the main body 10.

In the image reading section 20, the image data is divided into the image data of each color of R (red), G (green), and B (blue), and the image data of each color is output. The image data of each color is input to the image processing section 1 after various processings are performed, such as a correction processing of brightness variation, a correction processing of brightness characteristics, a resealing processing, a γ converting processing (a processing of converting brightness-linear characteristics to density-linear characteristics), a color correction processing, etc., in a correction processing section (not shown) which is in between the image reading section 20 and the image processing section 1.

The operating section 30 comprises various functional keys such as a start key for commanding the printing section to start printing, and number keys, etc., and when these functional keys or the touch panel 40 is operated, a corresponding operational signal is output to the control section 2.

The display section 50 comprises a LCD (Liquid Crystal Display) which is formed integrally with the touch panel 40, and displays various operational screens for a printing operation on the LCD.

The printing section 60 performs a printing output by an electrophotographic method based on the image data input from the image processing section 1 of the main body 10. In the electrophotographic method, an exposure is performed by irradiating laser beam from a laser light source on a photoconductive drum, and an electrostatic latent image is formed. An image forming is performed by transferring a toner image formed by spraying toner to the electrostatic latent image at a developing section to a recording sheet. In the embodiment of the present invention, printing output is performed by using 4 color materials of Y (yellow), M (magenta), C (cyan), K (black). When the image data of each color material is input, the printing section 60 performs a frequency modulation and a PMW (Pulse Width Modulation) conversion at a frequency modulation/PMW conversion processing section 61, and inputs a modulation signal to a LD driver 62. The LD driver 62 drives the laser light source based on the input modulation signal, and controls the laser beam irradiated from the laser light source, i.e. an amount of the exposure.

Next, each section of the main body 10 is explained.

The control section 2 controls operations of each section of MFP 100 in a centralized manner, according to various controlling programs such as a system program and a printing processing program, etc. stored in the storing section 3.

The storing section 3 stores various controlling programs performed by the control section 2, and also stores parameters and data, etc. required at each section. For example, the storing section 3 stores a 3 dimensional LUT used when a color conversion is performed at the image processing section 1, and also stores matrix data, etc. used when screen processing is performed.

The DRAM control section 4 controls input and output of the image data stored in the DRAM 5.

The DRAM 5 is an image memory which stores image data.

Next, the image processing section 1 according to the embodiment of the present invention is explained.

Figure 2:
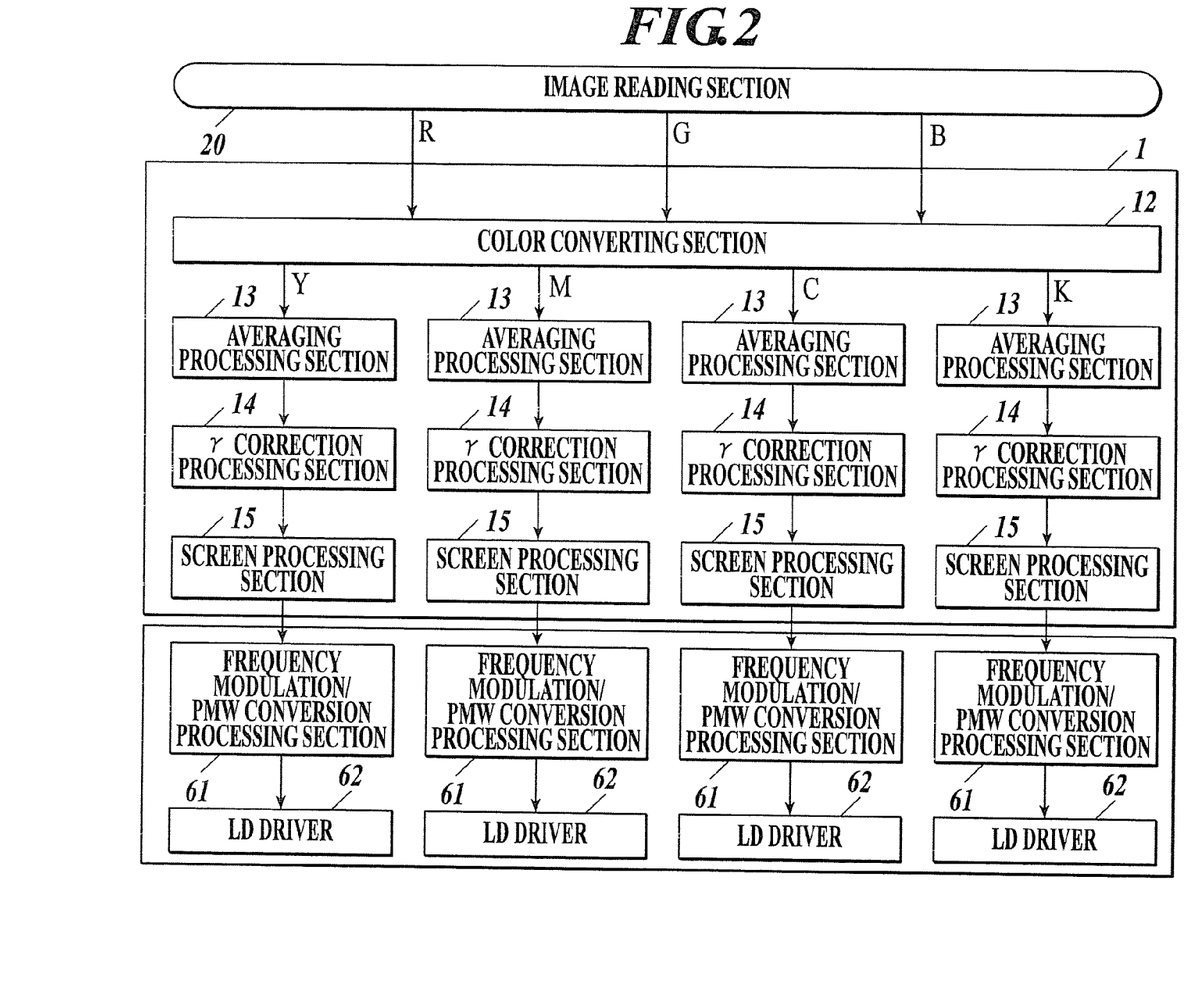
FIG. 2 is a diagram showing an internal configuration of an image processing section shown in FIG. 1.

As shown in FIG. 2, the image processing section 1 comprises an image determining section 11, a color converting section 12, an averaging processing section 13, a γ correction processing section 14, a screen processing section 15, etc. The averaging processing section 13, the γ correction processing section 14, and the screen processing section 15 are provided for each color of Y, M, C, and K.

The color converting section 12 performs a color correction to image data of each color of R, G, and B input from the image reading section 20, performs a color converting processing, to convert the input image data to image data for each color material of Y, M, C, and K which can be output from the MFP 100. Each of the image data of Y, M, C, and K generated by the color conversion is output to the averaging processing section 13 which corresponds to each of the colors.

Hereinbelow, a color converting method in the color converting section 12 is explained.

Figure 3:
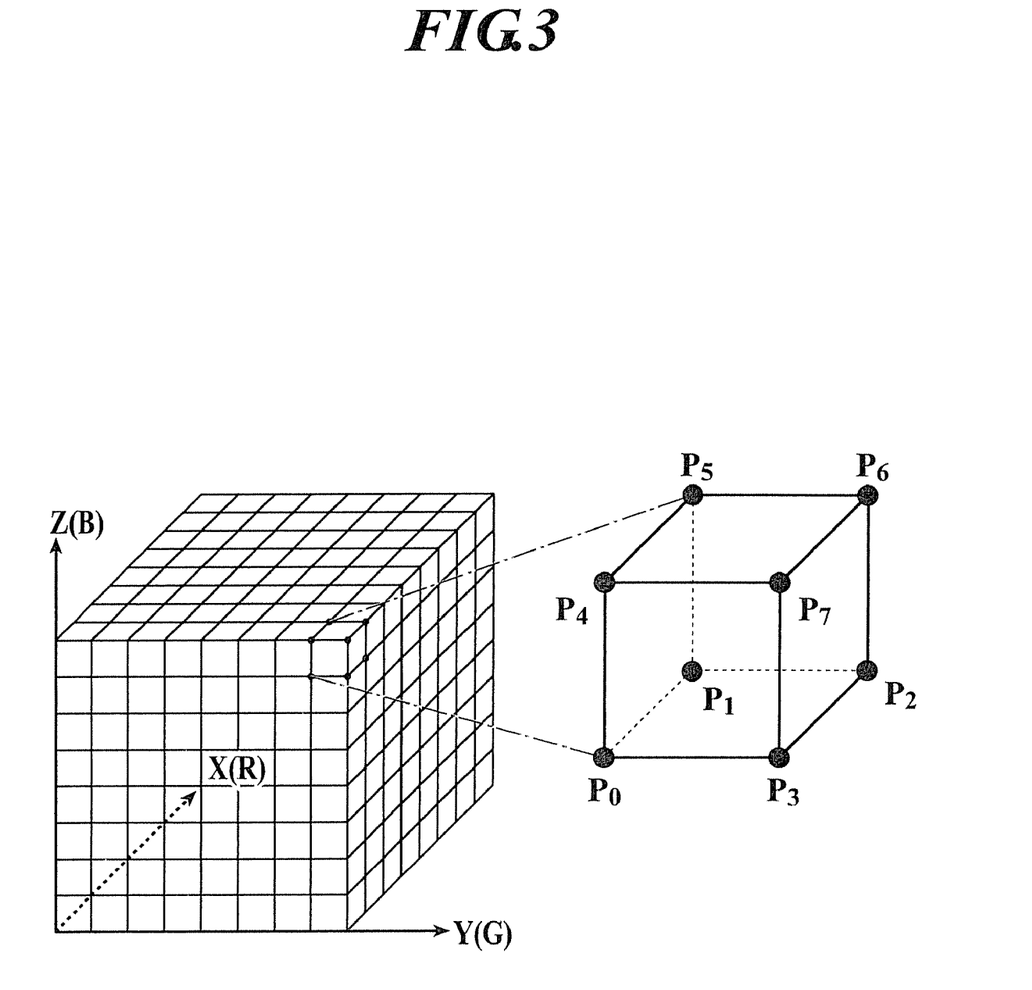
FIG. 3 is a schematic diagram of a 3 dimensional LUT.

As shown in FIG. 3, the 3 dimensional LUT is used in the color conversion. The 3 dimensional LUT shown in FIG. 3 is a table in which 3 dimensional color space configured with X-axis, Y-axis, and Z-axis corresponding respectively to 3 color components of R, G, and B, is divided at even intervals, and the output data value after the color conversion (a color conversion value) is set by determining the apex of the divided space domain as the lattice point. The output data value of the determined lattice point in the 3 dimensional LUT after the color conversion is referred to as the lattice point data. The 3 dimensional LUT is generated for each color of Y, M, C, and K, and each lattice point data is stored in the storing section 3. P0 to P7 shown in FIG. 3 indicate a portion of the lattice point data. As for the output data value, an actual measurement value, etc. obtained by an actual color measurement is applied.

In the color converting section 12, when the 3 dimensional LUT is retrieved from the storing section 3, the 3 dimensional Bi-cubic interpolating operation is performed based on the 3 dimensional LUT, and output image data of Y, M, C, and K corresponding to input image data of R, G, and B are output. The Bi-cubic interpolating operation refers to an operation in which the nearest lattice points are set as the primary neighborhood points, and the second nearest lattice points are set as the secondary neighborhood points, in the 3 directions of X, Y, and Z, with respect to the points corresponding to the input image data in the 3 dimensional LUT. Then, interpolating data of the primary neighborhood points and the secondary neighborhood points are calculated using the lattice point data. The interpolating data is the output image data corresponding to the input image data after the color conversion.

For convenience of explanation, first, an operation method of a 1 dimensional Bicubic interpolating operation is explained.

Figure 4:
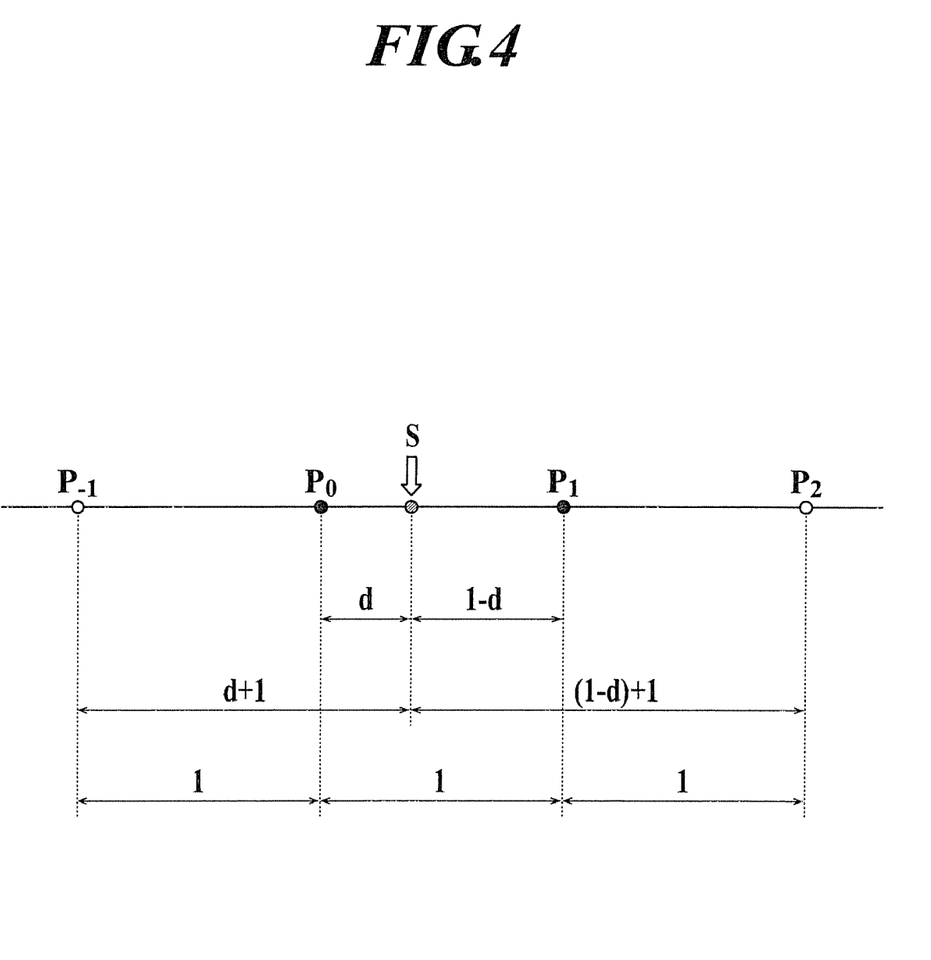
FIG. 4 is an explanatory diagram of a 1 dimensional Bi-cubic interpolating operation method.

FIG. 4 shows primary neighborhood points $P_0$, $P_1$, and secondary neighborhood points $P_{-1}$, $P_2$ with respect to the interpolating operation point S which is at an operational position of the interpolating data, in one given direction.

Because the lattice points are at even intervals, when the distance between the lattice points is 1, and the distance between the interpolating operation point S and $P_0$ out of the primary neighborhood points $P_0$ and $P_1$ is d, the distances between the interpolating operation point S and the other lattice point data $P_{-1}$, $P_1$, and $P_2$ can be described respectively as (d+1), (1−d), and (1−d)+1.

Then, the output data OUT of the interpolating operation point S can be obtained by the formula 1 described below.

$$\text{OUT} = \sum_{i=-1}^{2} (Wi \times Pi) \quad (1)$$

In formula 1, $P_i$, $W_i$ (i=−1, 0, 1, 2) are as follows.
$P_i$: lattice point data (primary neighborhood points, secondary neighborhood points)
$W_i$: weighting coefficient with respect to the lattice point data The weighting coefficient $W_i$ for the primary neighborhood point is obtained by the formula 2 described below, and the weighting coefficient $W_i$ for the secondary neighborhood point is obtained by the formula 3 described below.

primary neighborhood point:

$$Wi = (a+2) \times d^3 + (a+3) \times d^2 + 1 \quad (2)$$

secondary neighborhood point:

$$Wi = ad^3 - 5ad^2 + 8ad - 4a \quad (3)$$

In formulas 2 and 3, "a" is adjustable parameter. For example, −1, etc. can be applied as "a", and it can be set accordingly depending on the situation.

The 3 dimensional Bi-cubic method is a method for the interpolating operation in the 3 dimensional space by performing the above described operation in the 3 dimension. That is, as shown in FIG. 5, primary neighborhood points and secondary neighborhood points $P_i$ (x, y, z) in which x, y, z in the 3 directions of X-axis, Y-axis, and Z-axis, are −1, 0, 1, 2 are obtained, and correction data OUT is calculated by the formula 4 described below by using those primary neighborhood points and secondary neighborhood points.

$$\text{OUT} = \sum_{z=-1}^{2} \sum_{y=-1}^{2} \sum_{x=-1}^{2} (Wx \times Px)(Wy \times Py)(Wz \times Pz) \quad (4)$$

Figure 5:
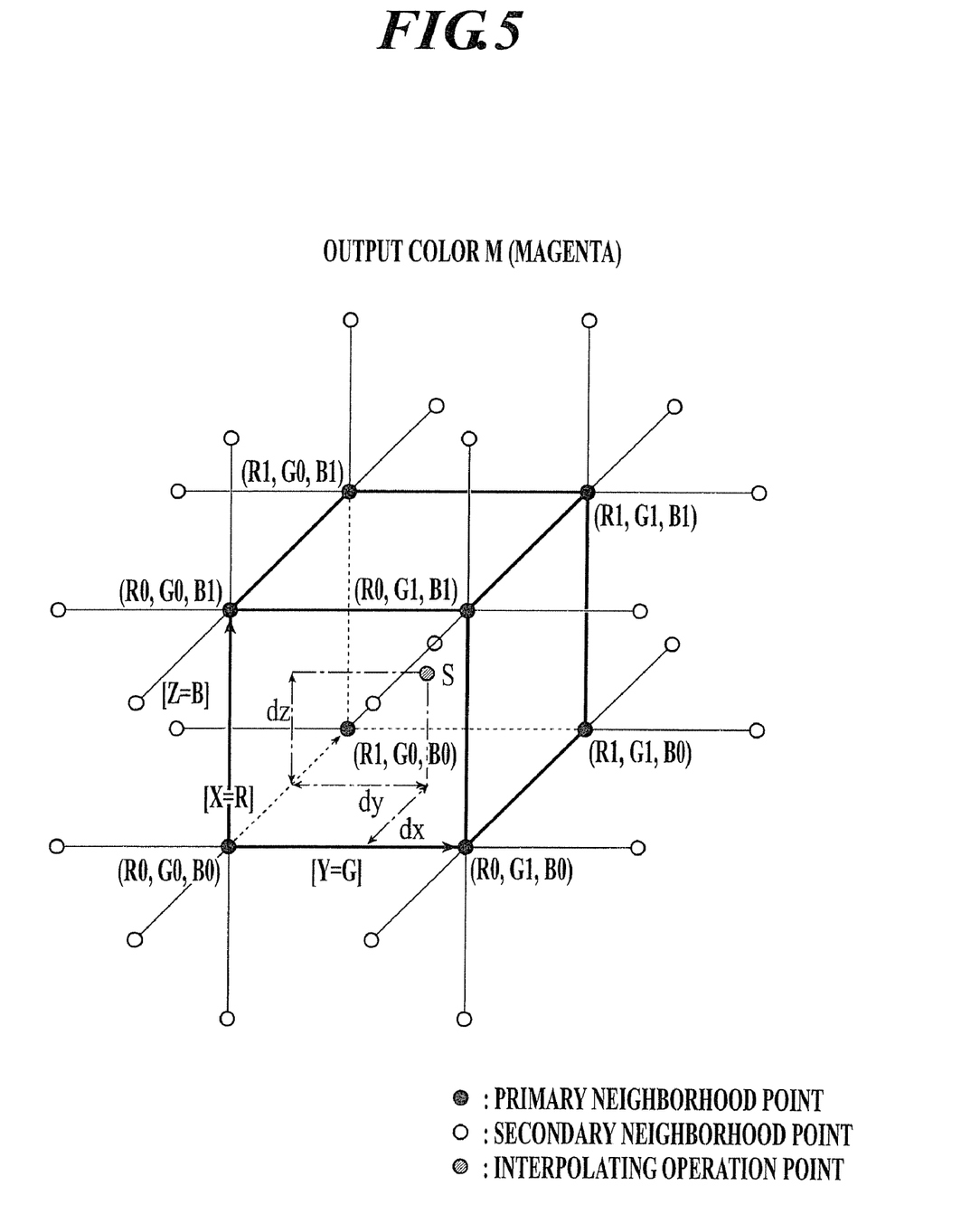
FIG. 5 is an explanatory diagram of a 3 dimensional Bi-cubic interpolating operation method.

The weighting coefficients $W_x$, $W_y$ and $W_z$ are calculated in each direction of X, Y, and Z by the above described formulas 2 and 3, in which the distance in the 3 directions of X, Y, and Z between the interpolating operation point S and any one point of the primary neighborhood points $P_i$ respectively are $d_x$, $d_y$, and $d_z$, as shown in FIG. 5.

When the interpolating operation point S is positioned near an end of the color space, there can be a case where the primary neighborhood points and the secondary neighborhood points which are referred to the 3 dimensional LUT partly do not exist. In such case, substitute data of the secondary neighborhood points (for example, lattice point data having the same value as that of the nearest primary neighborhood points) may be prepared and used when the interpolating operation is performed. Alternatively, as another method, +2 lattice point data (one data on each side) may be prepared beforehand on each axis (X, Y, Z in the example) on the external side of the required color space domain, and may interpolate the required color space domain by (constant) Bi-cubic operation.

The procedure of the color converting processing with the above mentioned 3 dimensional Bi-cubic interpolating operation by the color converting section 12 is explained with reference to the flowchart shown in FIG. 6. The color converting section 12 converts colors of the input image data of the RGB color space on a pixel to pixel basis. The process hereinbelow is repeatedly performed for each pixel.

Figure 6:
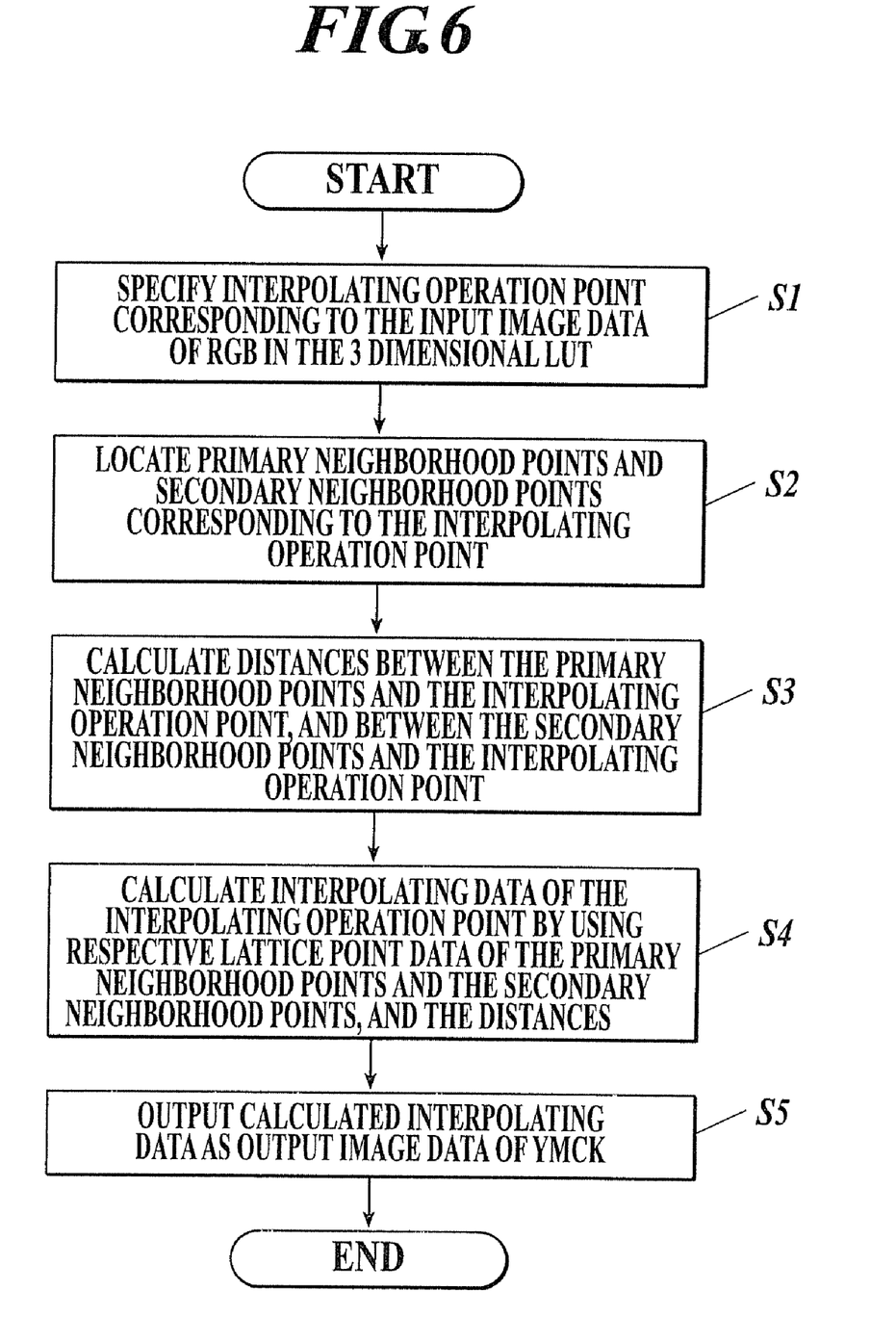
FIG. 6 is a flow chart explaining the procedure of color converting processing.

As shown in FIG. 6, the color converting section 12 first retrieves the 3 dimensional LUT corresponding to the color Y of the YMCK from the storing section 3. Then, the color converting section 12 specifies the interpolating operation point corresponding to the input image data in the 3 dimensional LUT (step S1), and locates the primary neighborhood points and the secondary neighborhood points corresponding to the interpolating operation point (step S2). That is, in the 3 dimensional color space shown in FIG. 5, the coordinate position specified by the pixel values (R value, G value, B value) of a given pixel of input image data is determined as the interpolating operation point, and the primary neighborhood points and the secondary neighborhood points are located. The primary neighborhood points are the 8 lattice points, each of which is the closest to the interpolating operation point. The secondary neighborhood points are the 24 lattice points, each of which is the second-closest to the interpolating operation point.

When the primary neighborhood points and the secondary neighborhood points are located, the distances between the respective primary neighborhood points and the interpolating operation point S, and the distances between the respective secondary neighborhood points and the interpolating operation point S are calculated (step S3). In the example shown in FIG. 5, the distances $d_x$, $d_y$, and $d_z$ between the primary neighborhood points $P_0$ and the interpolating operation point S are calculated. Then, the output data OUT at the interpolating operation point S is calculated by the above mentioned formulas 2 to 4, using the calculated respective distances and respective lattice point data of the primary neighborhood points and the secondary neighborhood points (step S4).

In the color converting section 12, the above mentioned processing is repeatedly performed for each pixel, and the output data OUT calculated for each pixel is output to the averaging processing section 13 of color Y as the output image data of color Y (step S5).

By repeatedly performing the processing of the above mentioned step S1 to step S4 sequentially using the 3 dimensional LUT of the colors M, C, K, the color converting section 12 obtains the output image data of the colors M, C, K in the same manner, and outputs the output image data to the averaging processing section 13 of each color.

When the color converting section 12 is configured as hardware, the color converting section 12 comprises 4 sets of operational circuit corresponding to output image data of the 4 colors respectively, and performs the processing in parallel for each color.

The averaging processing section 13 performs an averaging processing to the input image data. The image data of each color material for which the averaging processing is performed is respectively output to the corresponding γ correction processing section 14.

The γ correction processing section 14 performs a tone conversion of the input image data by using the LUT (Look Up Table) previously prepared for the γ correction and performs the γ correction processing. The image data of each color material for which the γ correction processing is performed is respectively output to the corresponding screen processing section 15.

The screen processing section 15 performs a screen processing by dither method to the input image data. In the screen processing, a matrix having different threshold value previously set in a matrix structure is retrieved from the storing section 3 and is applied to the input image data. Then the value is binarized or multileveled.

As described above, according to the embodiment of the present invention, the 3 dimensional Bi-cubic interpolating operation is performed by using the lattice point data of the primary neighborhood points and the secondary neighborhood points of the interpolating operation point in the 3 dimensional LUT, and the output data OUT at the interpolating operation point is calculated. In this manner, by performing the Bi-cubic interpolating operation with taking into account the lattice point data of not only the primary neighborhood points but also the secondary neighborhood points surrounding the interpolating operation point, even if the lattice point data values vary greatly with each other in between the adjacent lattice points, the precipitous variation of the output data can be restrained. Therefore, the continuity of the output data, that is, the smoothness of the output tone can be ensured.

Further, actual measurement values are applied to the lattice point data, and the lattice point data itself is not operated in the Bi-cubic interpolating operation. Accordingly, the continuity of the output data can be ensured without reducing the accuracy of the color conversion.

Figure 7:
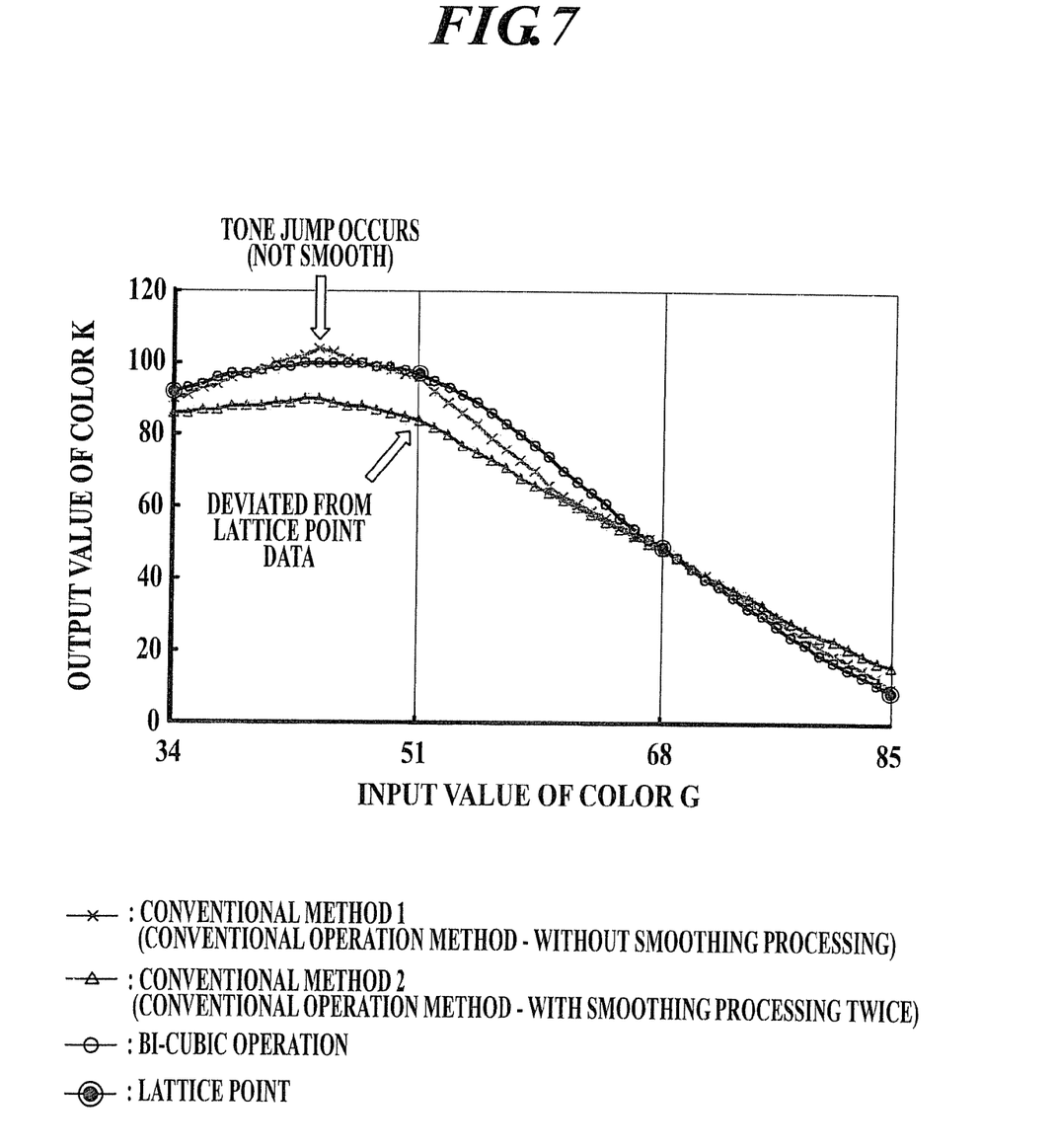
FIG. 7 is a diagram showing an output result obtained by the Bi-cubic interpolating operation.

FIG. 7 shows an output result obtained by both the conventional interpolating operation method and the 3 dimensional Bi-cubic interpolating operation. This result is data of a portion extracted from color space domain. The output result is shown in graphs in which the output data values of color K corresponding to the input data values of color G is plotted, because of the restriction caused by showing the result in 2 dimensions. The symbol ○ represents plot points obtained by the 3 dimensional Bi-cubic interpolating operation, the symbol x represents plot points obtained by the conventional interpolating operation method (for example, the interpolating operation method disclosed in Japanese Patent Application Laid-Open Publication No. 2003-338940) in which a smoothing processing was not performed (hereinbelow referred to as conventional method 1), and the symbol A represents plot points obtained by the conventional interpolating operation method in which the smoothing processings were performed twice (hereinbelow referred to as conventional method 2). The symbol ● represents the lattice point data.

As shown in FIG. 7, in the conventional method 1, although the lattice point data and the output data values match on the lattice points, the output data values partially vary precipitously, and the continuity of the output is not ensured. There may be cases in which image degradation called a tone jump occurs. The tone jump is a precipitous density variation which appears in a portion in which the output continuity does not exist. On the other hand, in the conventional method 2, in order to restrain the precipitous variation of the output data values, the smoothing processings were added to the conventional method 1. The conventional method 2 enabled to smooth the variation of the output data values, but the output data values deviated greatly from the lattice point data on the lattice points. Under such circumstances, the actual measurement values may not be reflected, and it is considered that the accuracy of color conversion is reduced.

On the other hand, by using the Bi-cubic interpolating operation according to the embodiment of the present invention, the lattice point data and the output data nearly match on the lattice points, and the data variation is smooth. Thus, not only the continuity of the output can be ensured but also the lattice point data can be reflected to the output data, and an accurate color conversion can be performed.

The above described embodiment is an example of a preferred embodiment of the present invention, and not limited to this.

For example, in order to simplify the above described 3 dimensional Bi-cubic interpolating operation, it may be replaced with a 2 dimensional Bi-cubic interpolating operation. By the 2 dimensional Bi-cubic interpolating operation, output result which is similar to that obtained by the 3 dimensional Bi-cubic interpolating operation can be obtained. In the 2 dimensional Bi-cubic interpolating operation, the input data is resolved into 2 dimensional planes with 3 directions (x-y plane, y-z plane, z-x plane), and interpolating data $OUT_{xy}$, $OUT_{yz}$, $OUT_{zx}$ is calculated by using the formulas 5 to 7 described below for each resolved 2 dimensional plane. Then, an average value of the $OUT_{xy}$, $OUT_{yz}$, $OUT_{zx}$ is calculated, and the average value is output as the final output data OUT.

$$OUT_{xy} = \sum_{y=-1}^{2} \sum_{x=-1}^{2} (W_x \times P_x)(W_y \times P_y) \quad (5)$$

$$OUT_{yz} = \sum_{z=-1}^{2} \sum_{y=-1}^{2} (W_y \times P_y)(W_z \times P_z) \quad (6)$$

$$OUT_{zx} = \sum_{x=-1}^{2} \sum_{z=-1}^{2} (W_z \times P_z)(W_x \times P_x) \quad (7)$$

The case in which 3 dimensional color space of RGB is color-converted to 4 dimensional color space of YMCK has been explained. However, the present invention can also be applied to cases in which color space is composed with other color components or in which color space has different number of dimensions. For example, when n dimensional color space is color-converted to m dimensional color space, n dimensional LUT for m number of colors may be prepared, and the n dimensional Bi-cubic interpolating operation may be performed by using the n dimensional LUT of each color.

The example of applying the present invention to MFP has been explained. However, the present invention can also be applied to cases in which other color conversion is performed such as the case of outputting n dimensional image data created by a general-purpose computer, etc. as m dimensional image data on a monitor.

According to an aspect of the preferred embodiments of the present invention, an image processing apparatus for converting input image data based on n dimensional color space to output image data based on m dimensional color space, comprises: a storing section to store a color conversion value in the m dimensional color space determined for every lattice point obtained by dividing the n dimensional color space as lattice point data; and a color converting section to determine an interpolating operation point in the n dimensional color space based on the input image data, to perform an n dimensional Bi-cubic interpolating operation by using the lattice point data of a primary neighborhood lattice point and the lattice point data of a secondary neighborhood lattice point of the interpolating operation point out of the stored lattice point data, and to calculate a color conversion value of the interpolating operation point in the m dimensional color space.

According to the apparatus, the interpolating operation in which not only the primary neighborhood points but also the secondary neighborhood points are taken into account can be performed. Accordingly, even if the difference of the lattice point data values in between the adjacent lattice points is large, the precipitous variation of the calculated color conversion values can be restrained. Therefore, the continuity of the output image data, that is, the smoothness of the output tone can be ensured. In cases where the lattice point data themselves are operated, such as the case where smoothing processing is performed to lattice point data, data values which originally are supposed to be the reference values cannot be reflected, and it is considered that the accuracy of the color conversion is degraded. However, according to the apparatus, because the interpolating operation is performed without operating the lattice point data, the data values which originally are supposed to be the reference values can directly be reflected to the color conversion, and the color conversion can be performed with high accuracy.

According to another aspect of the preferred embodiments of the present invention, an image processing apparatus for converting input image data based on n dimensional color space to output image data based on m dimensional color space, comprises: a storing section to store a color conversion value in the m dimensional color space determined for every lattice point obtained by dividing the n dimensional color space as lattice point data; and a color converting section to resolve the n dimensional space into (n−1) dimensional color spaces in an n direction, to determine an interpolating operation point based on the input image data of each of the (n−1) dimensional color spaces, to calculate a color conversion value by performing an (n−1) dimensional Bi-cubic interpolating operation by using the lattice point data of a primary neighborhood lattice point and the lattice point data of a secondary neighborhood lattice point of the interpolating operation point out of the stored lattice point data, and to calculate a color conversion value of the interpolating operation point in the m dimensional color space based on the color conversion value calculated for each of the (n−1) dimensional color spaces.

According to the apparatus, by resolving the n dimensional Bi-cubic interpolating operation to (n−1) dimensional Bi-cubic interpolating operation to perform the n dimensional Bi-cubic interpolating operation, the interpolating operation can be simplified and the operation time can be shortened. Because the Bi-cubic interpolating operation is an operation in which not only the primary neighborhood points but also the secondary neighborhood points are taken into account, even if the difference of the lattice point data values in between the adjacent lattice points is large, the precipitous variation of the calculated color conversion values can be restrained. Therefore, the continuity of the output image data, that is, the smoothness of the output tone can be ensured. In cases where the lattice point data themselves are operated, such as the case in which smoothing processing is performed to lattice point data, data values which originally are supposed to be the reference values cannot be reflected, and it is considered that the accuracy of the color conversion is degraded. However, according to the apparatus, because the interpolating operation is performed without operating the lattice point data, the data values which originally are supposed to be the reference values can directly be reflected to the color conversion, and the color conversion can be performed with high accuracy.

Preferably, the color converting section resolves the n dimensional space into 2 dimensional spaces in the n direction, calculates a color conversion value of each of the 2 dimensional spaces by performing a 2 dimensional Bi-cubic interpolating operation, and to calculate an average value of the calculated respective color conversion value of each of the 2 dimensional spaces as a color conversion value of the interpolating operation point in the m dimensional color space.

According to the apparatus, by resolving the n dimensional Bi-cubic interpolating operation to 2 dimensional Bi-cubic interpolating operation to perform the n dimensional Bi-cubic interpolating operation, the interpolating operation can be even more simplified and the operation time can be shortened.

According to another aspect of the preferred embodiments of the present invention, an image processing method for converting input image data based on n dimensional color space to output image data based on m dimensional color space by using a color conversion value in the m dimensional color space determined for every lattice point obtained by dividing the n dimensional color space as lattice point data, comprises: determining an interpolating operation point in the n dimensional color space based on the input image data; performing an n dimensional Bi-cubic interpolating operation by using the lattice point data of a primary neighborhood lattice point and the lattice point data of a secondary neighborhood lattice point of the interpolating operation point; and calculating a color conversion value of the interpolating operation point in the m dimensional color space.

According to the method, the interpolating operation in which not only the primary neighborhood points but also the secondary neighborhood points are taken into account can be performed. Accordingly, even if the difference of the lattice point data values in between the adjacent lattice points is large, the precipitous variation of the calculated color conversion values can be restrained. Therefore, the continuity of the output image data, that is, the smoothness of the output tone can be ensured. In cases where the lattice point data themselves are operated, such as the case where smoothing processing is performed to lattice point data, data values which originally are supposed to be the reference values cannot be reflected, and it is considered that the accuracy of the color conversion is degraded. However, according to the method, because the interpolating operation is performed without operating the lattice point data, the data values which originally are supposed to be the reference values can directly be reflected to the color conversion, and the color conversion can be performed with high accuracy.

According to another aspect of the preferred embodiments of the present invention, an image processing method for converting input image data based on n dimensional color space to output image data based on m dimensional color space by using a color conversion value in the m dimensional color space determined for every lattice point obtained from dividing the n dimensional color space as lattice point data, comprises: resolving the n dimensional space into (n−1) dimensional color spaces in an n direction; determining an interpolating operation point based on the input image data of each of the (n−1) dimensional color spaces; calculating a color conversion value by performing an (n−1) dimensional Bi-cubic interpolating operation by using the lattice point data of a primary neighborhood lattice point and the lattice point data of a secondary neighborhood lattice point of the interpolating operation point; and calculating a color conversion value of the interpolating operation point in the m dimensional color space based on the color conversion value calculated for each of the (n−1) dimensional color spaces.

According to the method, by resolving the n dimensional Bi-cubic interpolating operation to (n−1) dimensional Bi-cubic interpolating operation to perform the n dimensional Bi-cubic interpolating operation, the interpolating operation can be simplified and the operation time can be shortened. Because Bi-cubic interpolating operation is an operation in which not only the primary neighborhood points but also the secondary neighborhood points are taken into account, even if the difference of the lattice point data values in between the adjacent lattice points is large, the precipitous variation of the calculated color conversion values can be restrained. Therefore, the continuity of the output image data, that is, the smoothness of the output tone can be ensured. In cases where the lattice point data themselves are operated, such as the case in which smoothing processing is performed to lattice point data, data values which originally are supposed to be the reference values cannot be reflected, and it is considered that the accuracy of the color conversion is degraded. However, according to the method, because the interpolating operation is performed without operating the lattice point data, the data values which originally are supposed to be the reference values can directly be reflected to the color conversion, and the color conversion can be performed with high accuracy.

Preferably, in color-converting, the n dimensional space is resolved into 2 dimensional spaces in the n direction, a color conversion value of each of the 2 dimensional spaces is calculated by performing a 2 dimensional Bi-cubic interpolating operation, and an average value of the calculated respective color conversion value of each of the 2 dimensional spaces is calculated as a color conversion value of the interpolating operation point in the m dimensional color space.

According to the method, by performing by resolving the n dimensional Bi-cubic interpolating operation to 2 dimensional Bi-cubic interpolating operation to perform the n dimensional Bi-cubic interpolating operation, the interpolating operation can be even more simplified and the operation time can be shortened.

What is claimed is:

1. An image processing apparatus for converting input image data based on n dimensional color space to output image data based on m dimensional color space, comprising:
   a storing section configured to store a color conversion value in the m dimensional color space determined for every lattice point obtained by dividing the n dimensional color space as lattice point data; and
   a color converting section configured to determine an interpolating operation point in the n dimensional color space based on the input image data, to perform an n dimensional Bi-cubic interpolating operation by using (i) the lattice point data of each of a plurality of primary neighborhood lattice points, which respectively are nearest lattice points from the determined interpolating operation point, and (ii) the lattice point data of each of a plurality of secondary neighborhood lattice points, which respectively are second nearest lattice points from the determined interpolating operation point, out of the stored lattice point data, each of the primary neighborhood lattice points and each of the secondary neighborhood lattice points being located in any one axis direction in the n dimensional color space, and to calculate a color conversion value of the interpolating operation point in the m dimensional color space.

2. An image processing apparatus for converting input image data based on n dimensional color space to output image data based on m dimensional color space, comprising:
   a storing section configured to store a color conversion value in the m dimensional color space determined for every lattice point obtained by dividing the n dimensional color space as lattice point data; and a color converting section configured to resolve the n dimensional space into (n−1) dimensional color spaces in an n direction, to determine an interpolating operation point based on the input image data of each of the (n−1) dimensional color spaces, to calculate a color conversion value by performing an (n−1) dimensional Bi-cubic interpolating operation by using (i) the lattice point data of each of a plurality of primary neighborhood lattice points which respectively are nearest lattice points from the determined interpolating operation point, and (ii) the lattice point data of each of a plurality of secondary neighborhood lattice points, which respectively are second nearest lattice points from the determined interpolating operation point, out of the stored lattice point data, each of the primary neighborhood lattice points and each of the secondary neighborhood lattice points being located in any one axis direction in the (n−1) dimensional color spaces, and to calculate a color conversion value of the interpolating operation point in the m dimensional color space based on the color conversion value calculated for each of the (n−1) dimensional color spaces.

3. The image processing apparatus of claim 2, wherein,
the color converting section resolves the n dimensional space into 2 dimensional spaces in the n direction, calculates a color conversion value of each of the 2 dimensional spaces by performing a 2 dimensional Bi-cubic interpolating operation, and calculates an average value of the calculated color conversion value of each of the 2 dimensional spaces as a color conversion value of the interpolating operation point in the m dimensional color space.

4. An image processing method for converting input image data based on n dimensional color space to output image data based on m dimensional color space by using a color conversion value in the m dimensional color space determined for every lattice point obtained by dividing the n dimensional color space as lattice point data, comprising:

determining an interpolating operation point in the n dimensional color space based on the input image data;

performing an n dimensional Bi-cubic interpolating operation by using (i) the lattice point data of each of a plurality of primary neighborhood lattice points, which respectively are nearest lattice points from the determined interpolating operation point, and (ii) the lattice point data of each of a plurality of secondary neighborhood lattice points which respectively are second nearest lattice points from the determined interpolating operation point, each of the primary neighborhood lattice points and each of the secondary neighborhood lattice points being located in any one axis direction in the n dimensional color space; and calculating a color conversion value of the interpolating operation point in the m dimensional color space.

5. An image processing method for converting input image data based on n dimensional color space to output image data based on m dimensional color space by using a color conversion value in the m dimensional color space determined for every lattice point obtained from dividing the n dimensional color space as lattice point data, comprising:

resolving the n dimensional space into (n−1) dimensional color spaces in an n direction;

determining an interpolating operation point based on the input image data of each of the (n−1) dimensional color spaces;

calculating a color conversion value by performing an (n−1) dimensional Bi-cubic interpolating operation by using (i) the lattice point data of each of a plurality of primary neighborhood lattice points which respectively are nearest lattice points from the determined interpolating operation point, and (ii) the lattice point data of each of a plurality of secondary neighborhood lattice points which respectively are second nearest lattice points from the determined interpolating operation points, each of the primary neighborhood lattice points and each of the secondary neighborhood lattice points being located in any one axis direction in the (n−1) dimensional color spaces; and calculating a color conversion value of the interpolating operation point in the m dimensional color space based on the color conversion value calculated for each of the (n−1) dimensional color spaces.

6. The image processing method of claim 5, wherein color-converting the n dimensional space is resolved into 2 dimensional spaces in the n direction, a color conversion value of each of the 2 dimensional spaces is calculated by performing a 2 dimensional Bi-cubic interpolating operation, and an average value of the calculated color conversion value of each of the 2 dimensional spaces is calculated as a color conversion value of the interpolating operation point in the m dimensional color space.

* * * * *